Aug. 19, 1952    R. A. MORSE, SR    2,607,271
BRIDGE FOR EYEGLASSES
Filed Feb. 2, 1950
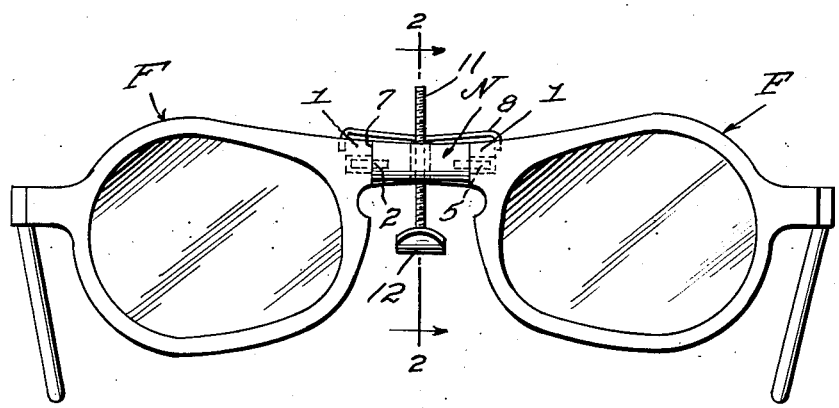
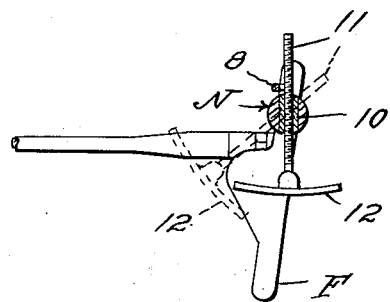
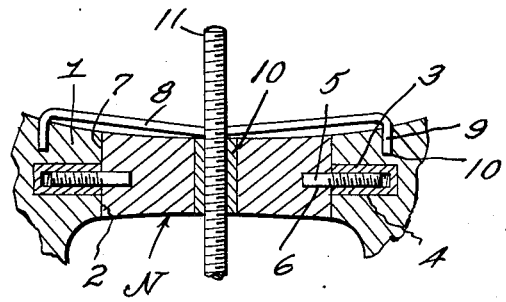
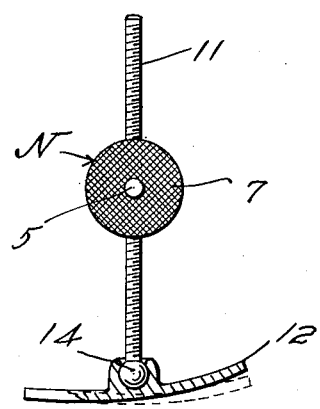
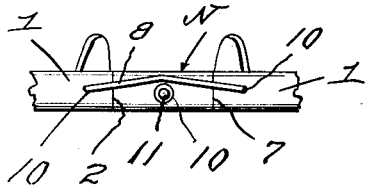
Inventor
Reginald A. Morse, Sr.
By Wilfred E. Lawson
Attorney Patented Aug. 19, 1952

2,607,271

UNITED STATES PATENT OFFICE 2,607,271

BRIDGE FOR EYEGLASSES

Reginald A. Morse, Sr., Edgewood, R. I.

Application February 2, 1950, Serial No. 141,971

1 Claim. (Cl. 88—43)

This invention relates to a nosepiece or bridge for eyeglasses and it is primarily an object of the invention to provide a device of this kind which is initially separate from the lens frame of the eyeglasses in order to permit the use of a nosepiece or bridge of a length as determined by the desired spacing of the frames to assure proper fitting.

It is also an object of the invention to provide a nosepiece or bridge for eyeglasses provided with means adjustable with respect to the nosepiece or bridge for engagement with the bridge of the nose of the wearer to facilitate proper fitting, especially when the nose of the wearer is unduly flat.

The invention consists in the details of construction and in the combination and arrangement of the several parts of my improved nosepiece or bridge for eyeglasses whereby certain advantages are attained, as will be hereinafter more fully set forth.

In order that my invention may be better understood, I will now proceed to describe the same with reference to the accompanying drawings, wherein:

Figure 1 is a view in front elevation of eyeglasses constructed in accordance with an embodiment of the invention;

Figure 2 is a detail sectional view taken substantially on the line 2—2 of Figure 1;

Figure 3 is a longitudinal sectional view taken lengthwise through the nosepiece with the adjacent portions of the lens frames also in section; certain of the parts being in elevation and the pad omitted;

Figure 4 is a view in end elevation of the nosepiece unapplied, the pad being partly in section; and Figure 5 is a view in top plan of Figure 3.

As illustrated in the accompanying drawings, F denotes the lens frame for eyeglasses of any desired design or material. In the present embodiment of the invention the inner or opposed ends of the frames F at the upper portions thereof are provided with the outwardly disposed short lugs 1, the outer or free ends 2 of which being substantially flat. The flat face 2 of each of the lugs 1 is in a plane at right angles to the axis of the lug 1 and also perpendicular to the longitudinal axis of the associated frame F.

Each of the lugs 1 at the axial center of its face 2 is provided with a socket 3 in which is snugly held a thimble or sleeve 4. Threading into or otherwise rigidly held within the thimble or sleeve 4 is an end portion of a pin 5. This pin 5 has an outer extremity extending a desired distance beyond the face 2 of the lug 1 to provide a stud snugly received within a socket 6 provided at the axial center of the flat end face 7 of a nosepiece or bridge N. The length of the nosepiece or bridge N is determined by the desired spacing of the frames F to assure a desired fitting. An optician or oculist will have on hand a series of nosepieces or bridges N of varying lengths and after ascertaining the spacing between the eyes of the person to be fitted, the optician or oculist will select a nosepiece or bridge N of a length closest to his measurement. It will therefore be readily noted that it will not be required to have on hand an extensive stock of different sized eyeglass frames now general in use wherein the frames and nosepieces or bridges are integral. On the contrary it is only required that the stock consist of the separate frames of required design together with nosepieces or bridges of different length as determined by the general conditions in the ophthalmic field.

After selecting the desired nosepiece or bridge N, the optician or oculist places the same between the desired frames F. The extended portions of the pins or studs 5 are tightly engaged within the socket 6 with the flat faces 2 of the lugs 1 in close contact with the flat end faces 7 of the nosepiece or bridge N which are preferably roughened.

After this assembly, the frames F and the interposed nosepiece or bridge are effectively held in proper relation by the tie bar 8 of requisite gauge, the extremities 9 of which being angularly disposed and fitted in the properly positioned sockets 10 in the top surfaces of the lugs 1. This bar 8 is bendable under requisite pressure but is normally inflexible. The bending of the bar 8 allows the bar to be adjusted to assure close contact between the faces 2 and 7.

The nosepiece or bridge N substantially midway its ends has disposed radially therethrough a sleeve 10 through which threads an elongated shank 11. Carried by one extremity of the shank 11 is a pad 12. The pad is elongated but relatively narrow and is of a material that can be bent to conform to the top surface of the bridge of the nose of a person to assure the pad having effective contact with that part of the nose. The pad may be made of a plastic material but, of course, I do not desire to be limited as to the material used.

The endwise adjustable shank 11 together with the pad 12 provides means whereby the eyeglasses may be fitted to the best advantage in such cases where the bridge of the nose of the wearer is unduly flat.

It is to be pointed out that in addition to adjustment of the pad 12 toward or from the nosepiece or bridge N as a result of endwise movement of the shank 11, the pad 12 may be selectively adjusted with certain limitations forwardly and rearwardly with respect to the nose of the person to be fitted by required rotations given to the nosepiece or bridge N which will be readily allowed by the inherent resiliency of the bar 8. The inherent resiliency of the bar 8 will also allow slight turning adjustment of the frames F as may be required at the time of fitting.

It is also believed obvious that the bar 8 serves to constantly urge the frames inwardly against the ends of the applied nosepiece or bridge N.

As shown in the accompanying drawings the pad 12 is in swiveled connection, as at 14, to the shank 11.

From the foregoing description it is thought to be obvious that an improved nosepiece or bridge for eyeglasses constructed in accordance with my invention is particularly well adapted for use by reason of the convenience and facility with which it may be assembled and operated.

I claim:

In combination, a pair of eyeglass frames, including the lenses therefor and a bridging structure, said bridging structure comprising a cylindrical element having axially disposed sockets in its ends, lugs formed at the inner sides of said frames substantially in line with the top sides thereof, thimbles set in the opposed faces of said lugs and having their interiors screw threaded, pins having unthreaded portions engaged in said sockets and screw threaded portions, said pins being adjustable relative to said frames to affect the lateral centering of the lenses with respect to the eyes, the top sides of said frames each having a socket therein, and a tie bar extending between said frames above said element and having downturned ends removably engaged in the last named sockets to retain the frames and the element in assembly.

REGINALD A. MORSE, Sr.

REFERENCES CITED

The following references are of record in the file of this patent:

UNITED STATES PATENTS

| Number | Name | Date |
|---|---|---|
| 1,206,135 | Otte | Nov. 28, 1916 |
| 1,307,118 | Day | June 17, 1919 |
| 1,872,562 | King | Aug. 16, 1932 |
| 2,103,340 | Schneck | Dec. 28, 1937 |
| 2,375,339 | Aspenleiter | May 8, 1945 |

FOREIGN PATENTS

| Number | Country | Date |
|---|---|---|
| 456,668 | Great Britain | Nov. 13, 1936 |